United States Patent Office 3,481,960
Patented Dec. 2, 1969

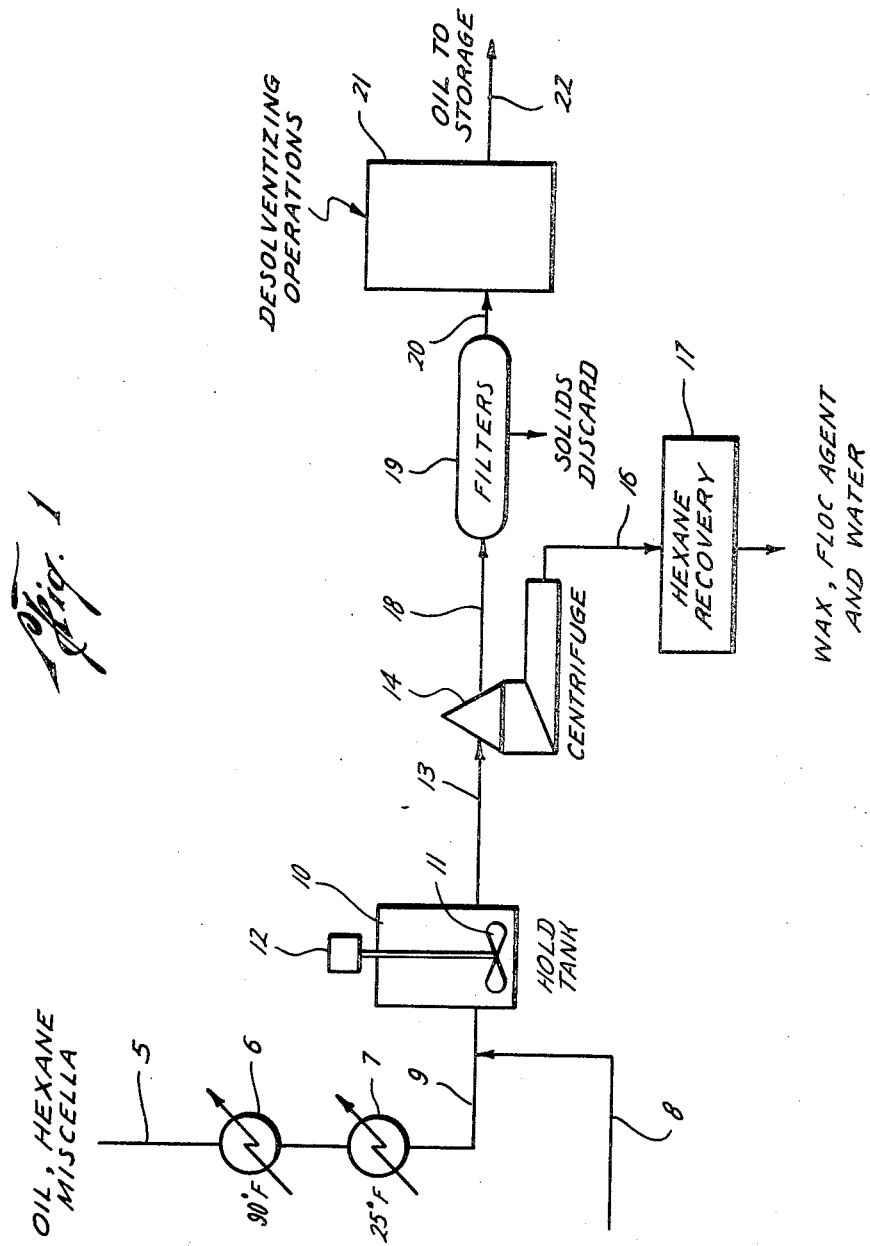

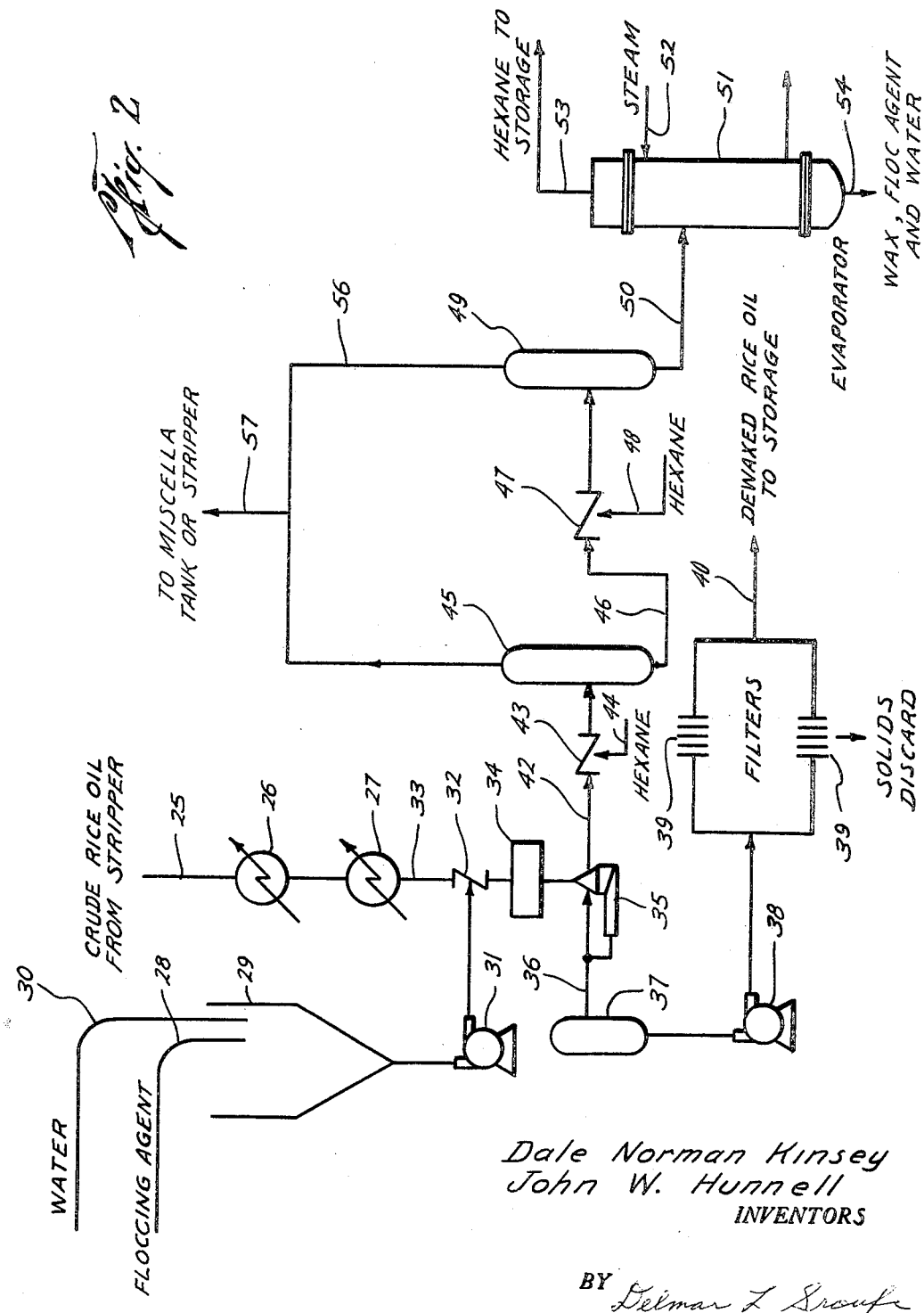

3,481,960
METHOD OF DEWAXING RICE OIL
Dale Norman Kinsey, Pasadena, and John W. Hunnell, Houston, Tex., assignors to Riviana Foods Inc., Houston, Tex.
Filed Nov. 7, 1967, Ser. No. 681,264
Int. Cl. C11b *3/00*
U.S. Cl. 260—424                                   12 Claims

ABSTRACT OF THE DISCLOSURE

Wax and other insoluble matter of rice oil are removed by chilling the oil or miscella, treating the same with a water solution of sodium silicate causing flocculation of the contaminant particles, and thereafter separating the wax floc from the oil by centrifuging and filtration steps.

BACKGROUND OF THE INVENTION

Field of the invention.

This invention relates to methods of removing wax, in particular, from rice oil.

Patent No. 3,261,690 of Truman B. Wayne discloses and claims an improved method of milling brown rice and, at the same time, economically producing an extracted rice oil which is of commercial value. This oil has a desirable low free fatty acid content, but a relatively high rice wax content, the latter usually being on the order of 2.0 to 3.5 percent by weight of the oil stream. Rice oil is also produced by the solvent extraction of rice bran, and oil so produced also contains a relatively high wax content. The wax content of rice oil obtained from extractive milling of rice or from rice bran should be substantially removed if the oil is to have maximum utility and commercial value for food and industrial oil uses.

Prior art

Many attempts have been made to remove wax fractions from crude rice oil by mechanical separations such as centrifuging and filtration at low temperatures. These techniques have been unsuccessful due, in part, to the small differences in specific gravity between the wax and rice oil and also due to the compaction of the rice wax under pressure in a filter to a slime or grease consistency which resists the passage therethrough of the rice oil.

Refining techniques previously in general use, such as alkali treatment of oil, will not remove wax from rice oil sufficienty to eliminate the cloudy appearance of the oil due to the presence of wax, particularly at lower temperatures. Treatment of rice oil with bleaching earth reported as an effective method of removing mucilaginous materials is not effective, as the slimy nature of the rice wax prevents satisfactory removal of the treatment material. Another common approach to refining of oils is the hydration of gumming materials, making them insoluble. However, the addition of water to rice oil per se does not render the wax any more insoluble or more readily recoverable by known mechanical methods.

Rice oil produced from the solvent extraction of rice bran or from the solvent extractive milling of rice is higher in wax content than most vegetable oils. Moreover, the wax from any type of rice oil is quite dissimilar in physical properties to the materials removed by conventional refining techniques, and it has been very difficult to remove by any conventional technique. Chilling in accordance with the conventional winterizing process, as used for other vegetable oils, does not produce crystallization. Instead the rice wax drops out of solution in an amorphous form having a loose, aggregate structure that easily becomes a uniform suspension. Loose aggregates reform if the suspension is allowed to rest. These aggregates then settle to a delicate mesh. If compacted by pressure, the waxy solids form a viscous, continuous mass which adheres to surfaces, thus resisting separation from the suspending liquid.

Summary of the invention

According to the present invention, a desolventized rice oil or a rice oil miscella, i.e., a solution of rice oil in an extracting solvent, as hexane, is usually first chilled to stimulate solidification of the wax in a cloudy suspension. The chilling step may be omitted if the oil or miscella to be treated is sufficiently cool. The temperature of the oil may be adjusted according to the amount of wax to be removed; however, a practical limit on the lower temperature range is imposed by the temperature at which silicate used in the flocculation step will congeal. A range of about 25° F. to about 45° F. for the oil during flocculation is presently preferred although some wax may be removed at higher temperatures. The chilled oil or miscella is then treated with a small quantity of a water solution of sodium silicate or potassium silicate as a flocculating agent and allowed to set for at least five minutes and preferably thirty minutes to one hour, or longer, to develop maximum flocculation of the wax. The oil is then subjected to centrifuging and filtration steps. This has been found to substantially remove the rice wax resulting in a clear oil having substantially increased commercial value, particularly in the edible oil field.

Sodium or potassium silicate may be employed as the flocculating agent in any ratio of sodium or potassium oxide to silica. We presently prefer commercial available forms of sodium silicate in which the proportion of sodium oxide to silica are in the broad range of 0.3 to 3.0 $Na_2O$:1 $SiO_2$. Within the broad range, we further prefer sodim silicate in the form having a ratio of 1.0 $Na_2O$ to 2.0 $SiO_2$. Potassium silicate has been found to be generally less effective than sodium silicate, but it may be used within the practice of this invention. If potassium silicate is used, we presently prefer a form having a ratio of 1.0 $K_2O$ to 2.5 $SiO_2$.

Our invention further contemplates the recovery of residual oil from the wax bearing floc removed from the rice oil by the addition of solvent to the floc to extract the oil; separating the wax and flocculating agent from the solvent; and desolventizing both the resulting miscella and wax fractions.

Brief description of drawings

FIG. 1 is a flow diagram illustrating method steps in refining and clarifying rice oil in a solvent miscella according to the present invention.

FIG. 2 is a flow diagram showing a combination of other method steps useful in clarifying and refining rice oil and usable either independently of the steps of FIG. 1 or in combination therewith.

Description of preferred embodiments

Several silicate floccing agents have been tested to determine the efficiency of flocculation of the wax content of rice oil at 40° F. In one series of tests a number of representative specimen from a single turn of rice oil were used. For each specimen of oil 0.1% of floccing agent (based upon the weight of the oil) was added to the oil with agitation, and the oil was then permitted to stand for 30 minutes. Each floccing agent was added as an aqueous solution in which the water content was 5% of the weight of the oil. The relative order of efficiency of the several agents was determined by ranking test samples, using the same oil for each sample, in their relative order of visible clear oil above the floc, starting with the one producing the greatest amount of clear oil and so on to the one producing the least clear oil. The agents were found to rank as follows:

(1) $Na_2O:2.0\ SiO_2$
(2) $Na_2O:SiO_2$
(3) $K_2O:2.5\ SiO_2$
(4) $2.0\ Na_2O:3.0\ SiO_2$, and $Na_2O:3.22\ SiO_2$ (about equally effective).
(5) $K_2O:2.1\ SiO_2$ In addition to the test of floccing agents at 0.1% of the oil weight, additions of 1%, 3% and 5% were tested in the same manner, both upon rice oil, and a rice oil in a hexane miscella of 10% rice oil and 90% hexane. For the specimens tested, no significant difference was found in the above ranking of agents for efficiency of wax flocculation. Throughout the test it was found that only the $Na_2O:2.0\ SiO_2$ form of sodium silicate showed consistent superiority over other agents tested, and the only agent which consistently produced substantially less flocculation was $K_2O:2.1\ SiO_2$. However potassium silicate in the form $K_2O:2.5\ SiO_2$ was found to flocculate the wax in oil or in an oil-hexane miscella with very satisfactory efficiency.

In one aspect of the invention the wax may be flocculated and removed from oil in a solvent miscella, and quantitative tests have been conducted to illustrate this aspect of the invention. One-gallon samples of a miscella containing 90% hexane and 10% rice oil of 2.41 original wax content were treated in accordance with the invention by first chilling each sample of the miscella to 40° F. For each test, 18 ml. of a water solution of floccing agent, at the concentration indicated below, was added to the chilled one-gallon sample of miscella and throughly mixed by gentle agitation. Each test sample was then held for about 30 minutes to flocculate the wax, and the treated miscella was thereafter centrifuged to remove the flocculated wax from the oil. Illustrative test results are as follows:

| Test | Floccing Agent (18 ml. of solution) | Wax Content After Centrifuging | Wax Removed, Percent |
|---|---|---|---|
| 1 | 5% $3.22\ Na_2O:1.0\ SiO_2$ | 0.93 | 61 |
| 2 | 5% $Na_2O:3.3\ SiO_2$ | 1.01 | 58 |
| 3 | 5% $Na_2O:2.54\ SiO_2$ | 0.72 | 70 |

In a further quantitative flocculation test of the rice oil miscella used in tests 1 through 3 above, the miscella was chilled to about 25° F. 18 ml. of a 2% aqueous solution of $NaO_2:2.0\ SiO_2$ was added with agitation and, after holding for five minutes, the mixture was centrifuged to remove the floc. The oil from the centrifuge contained 0.5% wax with 79% of the original wax content removed.

Similar tests have been conducted upon rice oil without the solvent. Test samples were prepared of the rice oil used in tests 1 to 3 but with the hexane removed. Each sample had an original wax content of 2.41%. 500 gms. of this oil were chilled to about 40° F. and 20 ml. of an aqueous solution of floccing agent, at the concentrations indicated below, was added to each rice oil sample with mild agitation. After about 30 minutes the oil was centrifuged to remove the wax. Illustrative test results are as follows:

| Test | Floccing Agent (20 ml. of Solution) | Wax Content After Centrifuging | Wax Removed, Percent |
|---|---|---|---|
| 4 | 5% $3.22\ Na_2O:1.0\ SiO_2$ | Trace | [1] 100 |
| 5 | 10% $3.22\ Na_2O:1.0\ SiO_2$ | 0.21 | 91 |
| 6 | 25% $3.22\ Na_2O:1.0\ SiO_2$ | 0.52 | 78 |
| 7 | 5% $Na_2O:2.0\ SiO_2$ | Trace | [1] 100 |
| 8 | 10% $Na_2O:2.0\ SiO_2$ | 0.08 | 97 |
| 9 | 5% $1.0\ Na_2O:1.0\ SiO_2$ | 0.02 | 99 |
| 10 | 10% $Na_2O:1.0\ SiO_2$ | 0.10 | 96 |
| 11 | 5% $Na_2O:3.2\ SiO_2$ | 0.02 | 99 |
| 12 | 10% $Na_2O:3.2\ SiO_2$ | 0.22 | 91 |

[1] Approximately.

The amount of water used with silicate floccing agents may be varied over wide limit within the scope of the present invention. The amount of silicate used may also vary from extremely low amounts up to an upper limit, usually about 25% silicate based upon the weight of oil, at which point the oil forms a gel with the silicate. In general it has been found that for both oil and miscella treatment, concentrations of silicate above about 5% based upon the weight of the oil treated results in substantially lower proportions of wax removed. This effect is illustrated in the following tests, Nos. 13 through 18, conducted upon one-gallon samples of 10% rice oil in hexane miscella, in which the rice oil contained an original wax content of 2.41%. The amount of silicate added was varied, but otherwise the test conditions and procedures were the same as those used for tests 1 through 3 above.

| Test | Amount of $Na_2O:2.54\ SiO_2$ (Based on Weight of Oil Treated), percent | Wax Removed, percent |
|---|---|---|
| 13 | 25 | (¹) |
| 14 | 10 | 19 |
| 15 | 5 | 76 |
| 16 | 3 | 78 |
| 17 | 1 | 83 |
| 18 | 0.5 | 81 |

[1] Sample gelled.

Illustrative tests of potassium silicate as the floccing agent were conducted by adding $K_2O:2.5\ SiO_2$ to one-gallon samples of the 10% miscella used in tests 13 through 18 compare as follows:

| Test | Amount of $K_2O:2.5\ SiO_2$ | Wax Removed, percent |
|---|---|---|
| 19 | 3% of oil weight | 71 |
| 20 | 1% of oil weight | 76 |
| 21 | 0.1% of oil weight | 82 |

The stripped rice oil containing 2.41% wax was tested with varying amounts of silicate under the conditions and procedures of tests 4 through 12 above. The results were as follows:

| Test | Silicate | Amount of Silicate Based Upon Oil Weight, percent | Wax Removed, percent |
|---|---|---|---|
| 22 | $Na_2O:2.54\ SiO_2$ | 0.02 | 95.6 |
| 23 | $Na_2O:2.54\ SiO_2$ | 0.004 | 95.6 |
| 24 | $Na_2O:2.54\ SiO_2$ | 0.002 | 95.6 |
| 25 | $Na_2O:2.54\ SiO_2$ | 0.0004 | 93.4 |
| 26 | $Na_2O:2.54\ SiO_2$ | 0.00004 | 91.0 |
| 27 | $K_2O:2.5\ SiO_2$ | 0.2 | 96.7 |
| 28 | $K_2O:2.5\ SiO_2$ | 0.02 | 91.2 |
| 29 | $K_2O:2.5\ SiO_2$ | 0.002 | 87.0 |
| 30 | $K_2O:2.5\ SiO_2$ | 0.0002 | 79.5 |

In general it has been found that very low amounts of silicate may be used in the practice of the invention. The use of proportions of silicate within the lower part of the range of silicate additions found to be efficient has obvious advantages in lower treatment costs and in reducing the amount of silicate in the wax fraction removed from the oil.

It should be understood that the test results set forth herein are illustrative examples of the present invention for particular wax-containing rice oil specimens. It should be understood that the present invention is not limited to the specific quantities of floccing agent or treating conditions except as set forth in the appended claims.

Turning now to the drawings, the present invention is further illustrated in the process shown in FIG. 1. In this process warm miscella—that is, a solution of rice oil and a solvent, as hexane—is supplied to feed pipe 5 after separation therefrom of bran and other solids by centrifugal and filtration actions as explained, for instance, in T. B. Wayne Patent No. 3,261,690 mentioned above. The feed stream first passes through a water cooler 6 and a mechanical or other refrigerator 7 which may be used to lower its temperature below 60° F., preferably on the order of 25–45° F., at which temperatures the wax constituent crystallizes to create a cloudy appearance. A flocculating agent, sodium silicate or potassium silicate, preferably aqueous sodium silicate or water glass of commerce, is added through a pipe 8 in proportions of approximately 0.00004% to 25.0%, preferably 0.0002% to 5% by weight of the oil processed. The silicate may be added as a water solution of any desired ratio, from 5% to 50% silicate in water has been used satisfactorily, and the mixed streams in pipe 9 are then held in tank 10 provided with a mixing impeller 11 driven by motor 12, for a suitable period to permit flocculation to proceed. Usually at least five minutes is required for this step and preferably about thirty minutes to one hour. At the end of the holding period, the mixture is passed through a pipe 13 to a centrifuge 14. The coagulated solid material (floc) is discharged through a pipe 16 to equipment 17 for separating the wax and other solids from remaining hexane solvent. Equipment 17 may consist of one or more strippers or other desolventizing apparatus. Preferably both the rice wax and solvent are receovered and preserved for sale or use.

The lighter oil is discharged from centrifuge 14 through a pipe 18 to filtering means 19 and thence through a pipe 20 to further desolventizing apparatus 21. The finally clarified and refined oil is passed to storage through a pipe 22. The end product oil is practically free of wax and gums, and other solid contaminants also are removed.

FIG. 2 shows in flow diagram form equipment for dewaxing previously desolventized rice oil. A pipe 25 receives the feed of crude oil from any source such as a rice oil solvent stripper or desolventizing apparatus. The feed oil may be passed through a water cooler 26 and mechanical refrigerator 27 to lower the temperature of the oil as desired, preferably below 60° F. and desirably to the range of 25 to 45° F. Sodium or potassium silicate fluocculating agent in proportions of approximately 0.00004% to 25.0%, preferably 0.002% to 0.5%, by weight of the rice oil to be treated is supplied through a pipe 28 and mixed in a hopper 29 with a quantity of water from a pipe 30 sufficient to produce a water solution. The ratio of water to silicate is not believed to be critical, and proportions from about 5% to 50% silicate in water have been used satisfactorily. The aqueous silicate is forced by a pump 31 through a blender 32 to mix with the chilled rice oil stream in pipe 33, and the blended streams are held in tank 34 for a period of time sufficient for maximum fluocculation of the suspended wax, such period being usually in excess of five minutes and preferably about thirty minutes to one hour. Thereafter, the oil and silicate mixture with coagulated wax and other solids is passed through a centrifugal separator 35. The dewaxed oil flows through a pipe 36 into a surge tank 37, thence is forced by a pump 38 through filters 39 and, ultimately, through a pipe 40 to storage for further processing or use.

The heavier or coagulated material is conveyed through a pipe 42 to a blender 43 where it is mixed with a supply of hexane solvent from a pipe 44 for extracting any remaining oil from the wax, gums, and other solid matter. The mixture of miscella and flocculating agent then passes through a first stage settling tank 45 from the bottom of which wax and other solids are discharged through a pipe 46 to a second stage blender 47, where more hexane is added through a pipe 48, and a second stage settling tank 49. The bottoms from tank 49 are discharged through a pipe 50 to a stripper vessel 51 to which steam is supplied at 52. The lighter hexane is discharged from the top through a pipe 53, while the water glass flocculating agent, solution water, and separated wax and other solids are withdrawn from the bottom through a pipe 54.

The miscella is discharged from the tops of first and second stage settling tanks 45 and 49 through pipes 55 and 56 to a collection pipe 57 which conveys the oil and solvent to miscella storage, or to a solvent stripper or other desolventizing apparatus.

As further indicated, the process steps described in connection with FIGS. 1 and 2 may be used independently or the equipment may be arranged in series, preferably with that in FIG. 2 following that in FIG. 1. Using the two dewaxing process steps of FIGS. 1 and 2 in series consistently produces a rice oil product which will remain clear at 32° F. for five hours or longer. Substantially all of the wax may be removed from the rice oil by the method or methods disclosed, and the resultant highly clarifield and refined oil commands a higher price on the market than rice oils obtained by previous methods. This is because of the removal of contaminating waxes as well as gums and coloring matter which previous refining methods have not removed from the oil. Such wax begins to crystallize at between 85 and 100° F. to create a cloudy appearance materially affecting the desirability of the oil. The increase in the value of the rice oil, as well as the by-product wax, substantially increase the total return from rice milling operations.

The process steps and the pieces of equipment utilized may be modified as will occur to those skilled in the art, and the exclusive use of all modifications and subcombinations as come within the scope of the appended claims is contemplated.

We claim:

1. In the art of dewaxing rice oil, the steps of maintaining said rice oil at a temperature between about 25° F. and about 45° F., treating the oil with a silicate in an amount less than 25% silicate based upon the weight of rice oil and in an amount at least sufficient to cause flocculation of solid wax particles in said oil, said silicate being added as an aqueous solution of a silicate selected from the group consisting of sodium silicate and potassium silicate, and mechanically separating the wax floc from the oil.

2. The process steps of claim 1 wherein the rice oil to be treated is dissolved in hexane and including the further step of separating the solvent from the rice oil after said wax floc has been separated therefrom.

3. The process steps of claim 1 in which the rice oil treating solution consists of water and sodium silicate.

4. The process of claim 1 in which the rice oil treating solution consists of water and potassium silicate.

5. The process of claim 3 in which said sodium silicate is $Na_2O:2.0\ SiO_2$.

6. The process of claim 4 in which said potassium silicate is $K_2O:2.5\ SiO_2$.

7. The process steps of claim 1 in which the silicate treated oil is subjected to centrifugal separation to remove the wax floc therefrom.

8. The process steps of claim 7 in which the oil discharged from the centrifuging step is subjected to filtration for additionally removing wax floc.

9. The process steps of claim 7 in which the feed stock oil is in the form of a rice oil and hexane miscella and including the further step of desolventizing the oil discharged from the centrifuging step.

10. The process of claim 7 including the further steps of treating the floc bearing discharge from the centrifugation step with hexane for extraction of residual oil from the wax, separating the wax from the miscella of the resultant mixture, and desolventizing both the miscella and wax fractions.

11. The process of claim 1 in which said silicate is added in an amount from 0.00004 to 25% of the weight of the oil.

12. The process of claim 1 in which said silicate is added in an amount from 0.0002 to 5% of the weight of the oil.

References Cited

UNITED STATES PATENTS

| | | | |
|---|---|---|---|
| 365,921 | 7/1887 | Hunt et al. | 260—424 |
| 2,680,754 | 6/1954 | Stapelberg | 260—412.4 |
| 2,701,810 | 2/1955 | Durkee | 260—425 |
| 2,802,844 | 8/1957 | Feuge et al. | 260—412.5 |
| 2,829,055 | 4/1958 | Ozai-Durrani | 260—412.4 XR |
| 2,990,255 | 6/1961 | Mickus et al. | 260—412.4 |
| 3,261,690 | 7/1966 | Wayne | 99—80 |

OTHER REFERENCES

Pominski et al.: Jour. Amer. Oil Chemists, Soc., 1954, pp. 451–455.

LEON ZITVER, Primary Examiner

HOWARD T. MARS, Assistant Examiner

U.S. Cl. X.R.

260—412.4

PO-1050
(5/69)

UNITED STATES PATENT OFFICE
CERTIFICATE OF CORRECTION

Patent No. 3,481,960          Dated December 2, 1969

Inventor(s) Dale Norman Kinsey and John W. Hunnell

It is certified that error appears in the above-identified patent and that said Letters Patent are hereby corrected as shown below:

Column 4, line 8, "SOi$_2$" should be -- SiO$_2$ --; line 67, "87.0" should be -- 87.5 --; and line 68, "79.5" should be -- 79.0 --. Column 5, line 37, "receovered" should be -- recovered --.

SIGNED AND
SEALED
JUN 2 1970

(SEAL)
Attest:

Edward M. Fletcher, Jr.
Attesting Officer

WILLIAM E. SCHUYLER, JR.
Commissioner of Patents